(12) United States Patent
Morimoto et al.

(10) Patent No.: US 6,564,933 B2
(45) Date of Patent: May 20, 2003

(54) CONVEYOR CHAIN

(75) Inventors: Takayuki Morimoto, Osaka (JP); Hitoshi Ohara, Osaka (JP); Takashi Nakagawa, Osaka (JP); Masatoshi Sonoda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/942,452

(22) Filed: Aug. 30, 2001

(65) Prior Publication Data
US 2002/0060142 A1 May 23, 2002

(30) Foreign Application Priority Data
Aug. 31, 2000 (JP) .......................................... 2000-262769

(51) Int. Cl.$^7$ .............................................. B65G 17/06
(52) U.S. Cl. ...................................... 198/850; 198/853
(58) Field of Search .................................. 198/850, 853

(56) References Cited

U.S. PATENT DOCUMENTS

| | | | | | |
|---|---|---|---|---|---|
| 4,126,219 A | * | 11/1978 | Bross | .......................... | 198/382 |
| 4,951,457 A | * | 8/1990 | Deal | .............................. | 59/78 |
| 5,125,504 A | * | 6/1992 | Corlett et al. | ................ | 198/850 |
| 5,174,439 A | * | 12/1992 | Spangler et al. | ............. | 198/850 |
| 5,253,749 A | * | 10/1993 | Ensch | ........................... | 198/850 |
| 5,303,818 A | * | 4/1994 | Gruettner et al. | ........... | 198/850 |
| 5,316,133 A | * | 5/1994 | Moser | .......................... | 198/850 |
| 5,377,819 A | * | 1/1995 | Horton et al. | ............... | 198/853 |
| 5,562,200 A | * | 10/1996 | Daringer | .................... | 198/844.2 |
| 5,573,106 A | * | 11/1996 | Stebnicki | .................... | 198/853 |
| 5,586,644 A | * | 12/1996 | Coen et al. | .................. | 198/853 |
| 5,957,268 A | * | 9/1999 | Meulenkamp | ............... | 198/850 |
| 5,996,776 A | * | 12/1999 | Van Zijderveld | ........... | 198/853 |
| 6,073,756 A | * | 6/2000 | Damkjaer et al. | ........... | 198/853 |
| D427,898 S | * | 7/2000 | Loh | ............................. | D8/499 |
| 6,138,820 A | * | 10/2000 | Ewert | .......................... | 198/850 |
| 6,189,686 B1 | * | 2/2001 | Shibayama et al. | ......... | 198/853 |
| 6,227,356 B1 | * | 8/2001 | Van Zijderveld et al. | ... | 198/850 |
| 6,305,530 B1 | * | 10/2001 | Guldenfels | .................. | 198/853 |

* cited by examiner

Primary Examiner—Christopher P. Ellis
Assistant Examiner—Rashmi Sharma
(74) Attorney, Agent, or Firm—Howson and Howson

(57) ABSTRACT

A conveyor chain has a number of chain units connected together by connecting pins in an endless fashion. Each of the chain units is composed of a plurality of inverted tooth plates disposed in the width direction of the chain, and a slat disposed on one side of the tooth plates and extending across the width of the chain transversely across the tooth plates for carrying an object to be conveyed. The tooth plates each have a pair of inverted teeth formed on the other side thereof for meshing with sprocket teeth, and a pair of pin-accommodation holes for receiving a pair of connecting pins, respectively. The connecting pins each connect adjacent two chain units such that the tooth plates of one chain unit are interleaved with the tooth plates of the other chain unit.

22 Claims, 13 Drawing Sheets

US 6,564,933 B2

CONVEYOR CHAIN

BACKGROUND OF THE INVENTION

1. Field of the Invention

The present invention relates to a conveyor chain driven by a sprocket to transport an object along a conveyance path.

2. Description of the Related Art

There are known various conveyor chains used for conveyance of an object along a conveyance path. A typical example of such known conveyor chains is shown here in FIGS. 13A and 13B, which is composed of a series of chain units connected with one another by connecting pins in an endless fashion. Each of the chain units includes a rectangular top plate A1 for carrying thereon an object to be conveyed, front and rear bushing portions A2 and A3 located at a leading edge and a trailing edge, respectively, of the top plate A1 on the back side of the top plate A1. Adjacent two chain units are connected by a single connecting pin extending through the rear bushing portion A3 of one chain unit and the front bushing portion A2 of the other chain unit.

The bushing portions A2, A3 disposed on the back side of the top plates A2 are adapted to engage a sprocket (not shown) to move the conveyor chain in a conveyance direction.

In the conventional top plate type conveyor chain described above, since the bushing portions A2, A3 disposed on the back side of each top plate A1 collide with the bottom of a sprocket tooth when the chain comes into mesh with the sprocket, a large impact sound is generated. The impact sound occurs repeatedly with a frequency generally equal to the frequency of meshing between the chain and the sprocket. This periodic impact sound forms a main part of the noises generated during conveyance travel of the chain. Another problem is that the collision occurring periodically between the bushing portions of chain and the tooth bottoms of sprocket can cause a movement of the free span of the chain in a direction perpendicular to the chain travel but in the same plane as the chain and the sprocket. This vibratory movement of the chain can also produce a vibratory noise which increases the noise level during conveyance travel of the chain.

The conventional top plate type conveyor chain does not have any means effective to prevent the chain from moving or oscillating in the width direction of the chain while the chain travels along a conveyance path. Accordingly, when the lateral oscillatory movement of chain occurs, an object carried on the top plates A1 becomes unstable in position and may sometime fall from the top plates A1.

SUMMARY OF THE INVENTION

With the foregoing difficulties associated with the prior art in view, an object of the present invention is to provide a conveyor chain which is capable of reducing the impact sound or the contact sound during meshing with a sprocket to thereby suppress the noise and vibration during conveyance, is able to carry a conveyed object stably during conveyance without causing lateral movement which may result in accidental falling of the object, and can be assembled with a relatively small number of parts used.

To achieve the above object, according to the present invention, there is provided a conveyor chain comprising a number of chain units connected with one another by connecting pins in an endless fashion. The chain has an outer peripheral side adapted to carry an object for conveyance of the object along a conveyance path and an inner peripheral side adapted to engage a sprocket for transmitting power from the sprocket to the chain. Each of the chain units is composed of a plurality of inverted tooth plates disposed in the width direction of the chain. Each of the inverted tooth plates has a pair of inverted teeth formed on one side thereof for meshing with teeth of the sprocket, and a pair of pin-accommodation holes formed therein for receiving a pair of connecting pins, respectively, of the connecting pins. Each of the connecting pins connecting adjacent two chain units in such a manner that the inverted tooth plates of one chain unit are interleaved with the inverted tooth plates of the other chain unit.

When the conveyor chain of the foregoing construction comes into mesh the sprocket, the engagement surfaces of inverted tooth plates (formed by the inside flanks and/or the outside flanks of the inverted teeth) slide on sprocket tooth flanks while maintaining a small incident angle with respect to the sprocket tooth flanks. This sliding contact can reduce the impact energy or force produced between the inverted tooth plates and the sprocket. It is, therefore, possible to eliminate the large impact sound that occurs in the meshing between of conventional top plate type conveyor chain and a sprocket. In addition, since the periodic sound resulting from the impact sound at the onset of meshing can be eliminated, and since the vibratory noise resulting from collision at the bottom of the sprocket tooth or the contact sound resulting from contact with the tip of the sprocket tooth does not occur, the noise level of the conveyor chain during its travel when operating as a conveyor is greatly reduced.

In one preferred form of the present invention, the teeth of inverted tooth plates located at one end of each chain unit and the teeth of inverted tooth plates located at the other end of the same chain unit are aligned with each other in the longitudinal direction of the chain. As an alternative, the teeth of inverted tooth plates located at one end of each chain unit and the teeth of inverted tooth plates located at the other end of the same chain unit are offset half a pitch in the width direction of the chain.

In another preferred form of the present invention, two inverted teeth of each chain unit that are located at opposite outer ends in the width direction of the chain are adapted for slide contact with opposite end faces of the sprocket and have a height larger than the height of the other inverted teeth of the same chain unit. As an alternative, a central inverted tooth of each chain unit that is located at the center in the width direction of the chain is adapted for slide contact with opposed inside surfaces of two laterally juxtaposed sprockets and has a height larger than the height of the other inverted teeth of the same chain unit.

In a further preferred form of the present invention, the chain units each have a flat guide surface disposed on the inner peripheral side of the chain and extending in the longitudinal direction of the chain for slide contact with a guide rail disposed along the conveyance path. The flat guide surface may be formed by a truncated tip end face of at least one selected tooth of the inverted teeth.

In a still further preferred form of the present invention, two inverted teeth of each chain unit that are located at opposite outer ends in the width direction of the chain each have a guide lug projecting in a lateral outward direction for slide contact with a side guide rail provided on each side of the chain along the conveyance path, so as to prevent the chain from floating during travel.

It is preferable that each of the pair of inverted teeth has a slit opening to a tip end and opposite end faces of the inverted tooth. By thus providing the slit, the teeth are elastically deformable when meshing with the sprocket teeth. This elastic deformation is effective to reduce the slide sound to a negligible level during meshing engagement between the teeth of the inverted tooth plates and the sprocket teeth.

In another preferred form of the present invention, each of the chain units further has a slat disposed on the respective other sides of the inverted tooth plates and extending across the width of the chain transversely across the inverted tooth plates. The slat may be integral with the inverted tooth plates of each chain unit, or assembled with the inverted tooth plates of each chain unit.

It is preferable that the slat of each chain unit has a wing portion projecting in a lateral outward direction from an outermost inverted tooth plate of the chain unit, the wing portion having a straight leading edge and a convexly arcuate trailing edge when viewed from the direction of conveyance, and the pin-accommodation holes that are located adjacent to the trailing end of the chain unit comprise an oblong hole having a major axis extending substantially parallel to the longitudinal direction of the chain. This arrangement enables the conveyor chain to pass a curved portion in a horizontal plane in the conveyance path without causing collision or overlapping of the adjacent slats.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

The following description is merely exemplary in nature and is in no way intended to limit the invention or its application or uses.

Figure 1A:
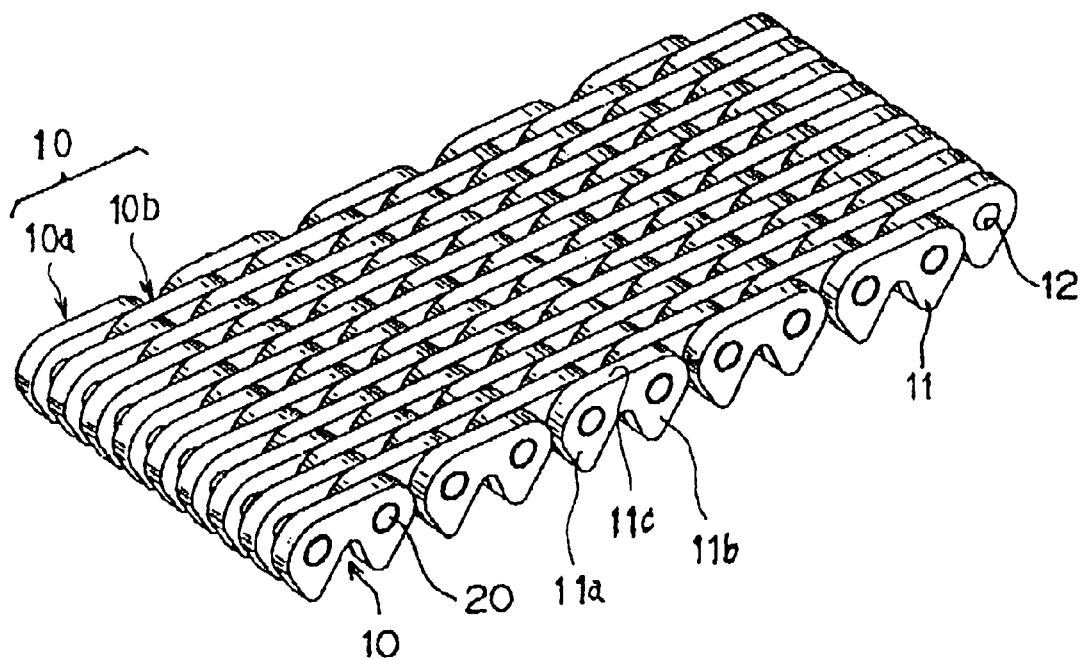
FIG. 1A is a fragmentary perspective view of a conveyor chain according to a first embodiment of the present invention.
Figure 1B:
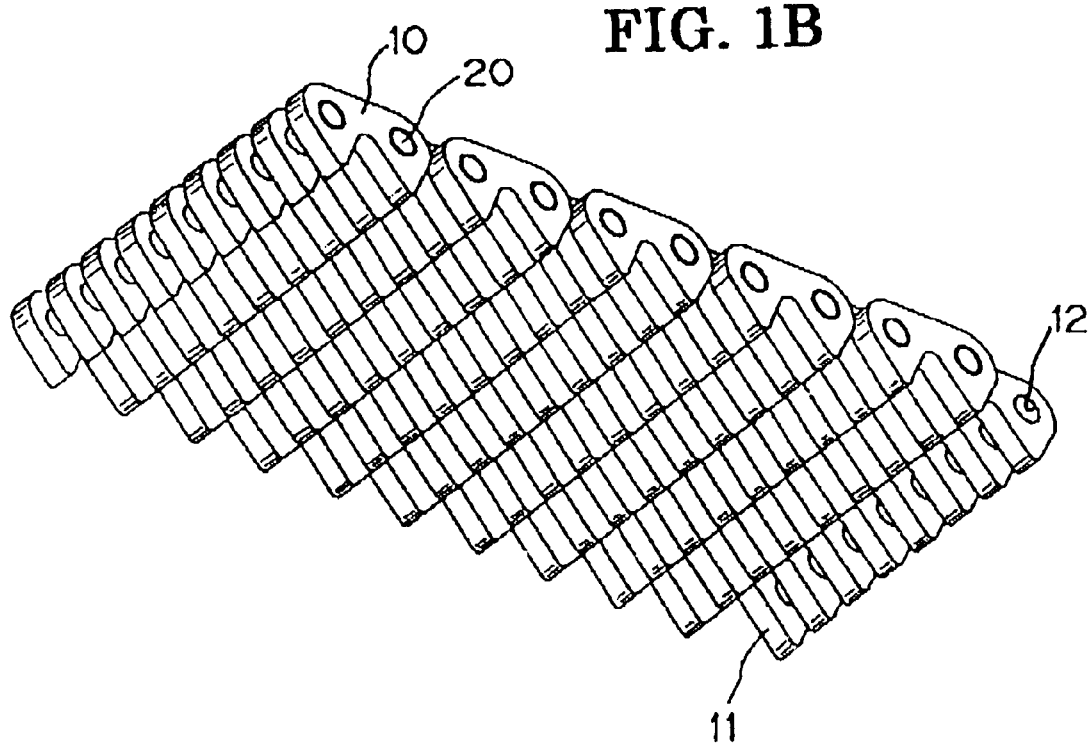
FIG. 1B is a fragmentary perspective view of the conveyor chain of FIG. 1A from the opposite side.

Referring now to the drawings and FIGS. 1A and 1B in particular, there is shown a part of a conveyor chain according to a first embodiment of the present invention. As shown in these figures, the conveyor chain (hereinafter referred to simply as "chain") comprises a number of chain units 10 connected with one another by connecting pins 20 in an endless fashion. The chain has a flat outer peripheral side (not designated but shown in FIG. 1A) adapted to carry an object to be conveyed (not shown) and a toothed inner peripheral side (not designated but shown in FIG. 1B) adapted to engage a sprocket (not shown) for transmitting power from the sprocket to the chain.

Each of the chain units 10 is composed of a plurality of inverted tooth plates 11 disposed in the width direction of the chain. Each of the inverted tooth plates 11 has a pair of inverted teeth 11a, 11b formed on one side thereof for meshing with teeth of the sprocket, a flat back face 11c formed on the other side thereof as a part of a object-carrying surface provided on the flat outer peripheral side of the chain, and a pair of pin-accommodation holes 12 formed therein for receiving a pair of connecting pins 20, respectively, of the connecting pins 20. The inverted tooth 11a and 11b have a profile similar to that of meshing teeth of link plates of a silent chain. Both the pin-accommodation holes 12 and the connecting pins 20 have a circular shape in cross-section.

In the illustrated embodiment, the chain units 10 are composed of first chain units 10a and second chain units 10b alternately arranged in the longitudinal direction of the chain. Each of the first chain units 10a is composed of an odd number of inverted tooth plates 11, and each of the second chain units 10b is composed of an even number of inverted tooth plates 11. The number of the inverted tooth plates 11 in each second chain unit 10b is one smaller than the number of the inverted tooth plates 11 in each first chain unit 10a. Either one or both of the inside flanks and the outside flanks of inverted teeth 11a, 11b form an engagement surface which is engaged with sprocket tooth flanks when the inverted tooth plates 11 of the chain mesh with sprocket teeth.

Each of the connecting pins 20 connects adjacent two chain units 10 (10a and 10b) in such a manner that the inverted tooth plates 11 of one chain unit 10 (10a or 10b) are interleaved with the inverted tooth plates 11 of the other chain unit 10 (10b or 10a).

In operation, when the conveyor chain of the foregoing construction comes in mesh the sprocket, the engagement surface of inverted tooth plates 11 (formed by the inside flanks and/or the outside flanks of the inverted tooth 11a, 11b) slides on a sprocket teeth flank while keeping a small incident angle with respect to the sprocket tooth flank. This slide contact can reduce the impact energy or force produced between the inverted tooth plates 11 and the sprocket. It is, therefore, possible to eliminate the generation of such a large impact sound as occurring in the meshing between the conventional top plate type conveyor chain and the sprocket. In fact, the noise level of a sliding sound produced by the slide contact between the engagement surface of the inverted tooth plates 11 and the sprocket tooth flank is considerably low as compared to the noise level of the impact sound. In addition, since the generation of a periodic sound resulting from the impact sound at the onset of meshing can be eliminated, and since the generation of a vibratory noise resulting from collision at the bottom of the sprocket tooth or a contact sound resulting from contact with the tip of the sprocket tooth does not occur, the noise level of the conveyor chain during conveyance travel is greatly reduced.

Figure 2A:
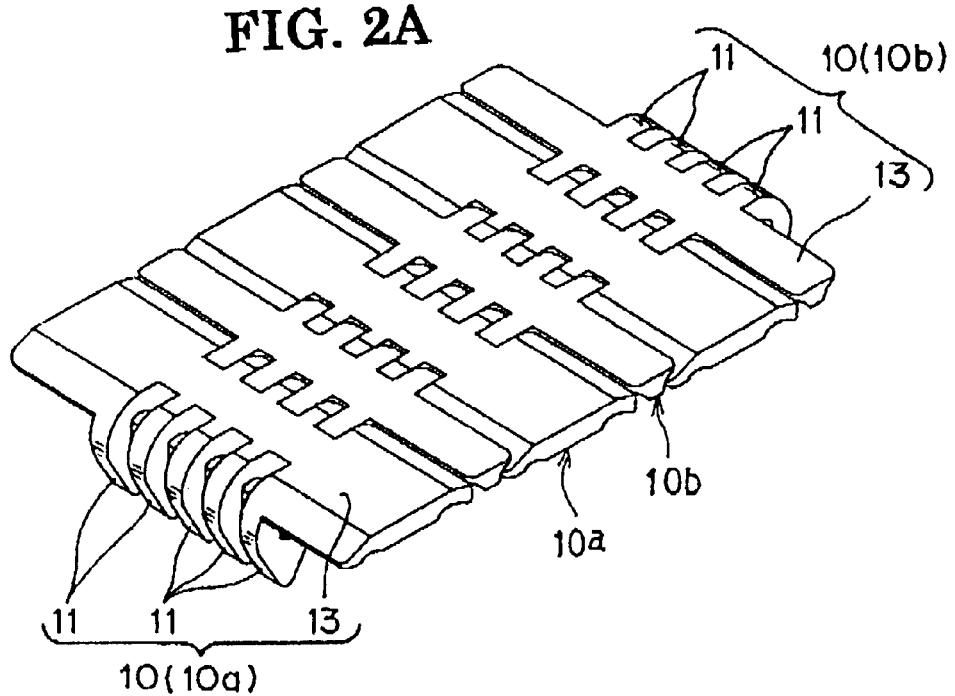
FIG. 2A is a fragmentary perspective view of a conveyor chain according to a second embodiment of the present invention.
Figure 2B:
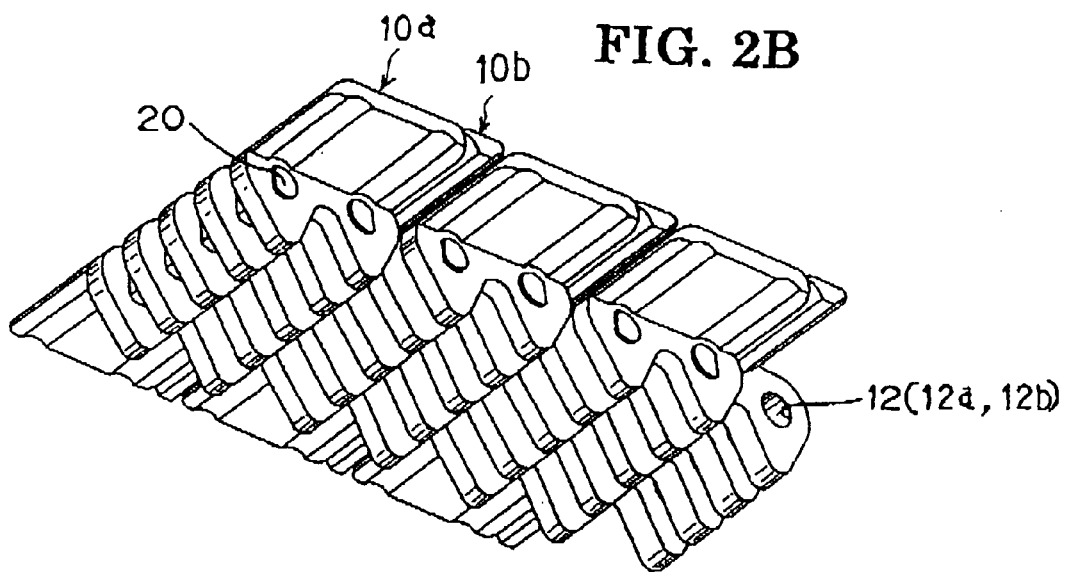
FIG. 2B is a fragmentary perspective view of the conveyor chain of FIG. 2A from the opposite side.

FIGS. 2A and 2B show a part of a conveyor chain according to a second embodiment of the present invention. As shown in these figures, the conveyor chain comprises a number of chain units 10 connected with one another by connecting pins 20 in an endless fashion. The chain has a flat outer peripheral side (described later in detail) adapted to carry an object to be conveyed (not shown) and a toothed inner peripheral side (not designated but shown in FIG. 2B) adapted to engage a sprocket (not shown) for transmitting power from the sprocket to the chain.

The chain units 10 are composed of first chain units 10a and second chain units 10b alternately arranged in the longitudinal direction of the chain. Each of the first chain units 10a is composed of an odd number of inverted tooth plates 11 disposed in the width direction of the chain, and a slat 13 disposed on an upper side of the inverted tooth plates 11 (which is opposite to the toothed lower side of the plates 11) and extending across the width of the chain transversely across the inverted tooth plates 11. Similarly, each of the second chain units 10b is composed of an even number of inverted tooth plates 11 disposed in the width direction of the chain, and a slat 13 disposed on an upper side of the inverted tooth plates 11 (which is opposite to the toothed lower side of the plates 11) and extending across the width of the chain transversely across the inverted tooth plates 11. The number of the inverted tooth plates 11 in each second chain unit 10b is one smaller than the number of the inverted tooth plates 11 in each first chain unit 10a. The slat 13 of the first chain units 10a has a larger object-carrying surface area than the slat 13 of the second chain units 10b.

In the illustrated embodiment, the slat 13 is formed integrally with the inverted tooth plates 11 of a single chain unit 10 (10a, 10b). The slat 13 may be formed as a separate component or part structurally independent from the inverted tooth plates 11, in which instance the slat 13 is assembled with the inverted tooth plates 11 preferably by way of a snap-fit connection.

Figure 3A:
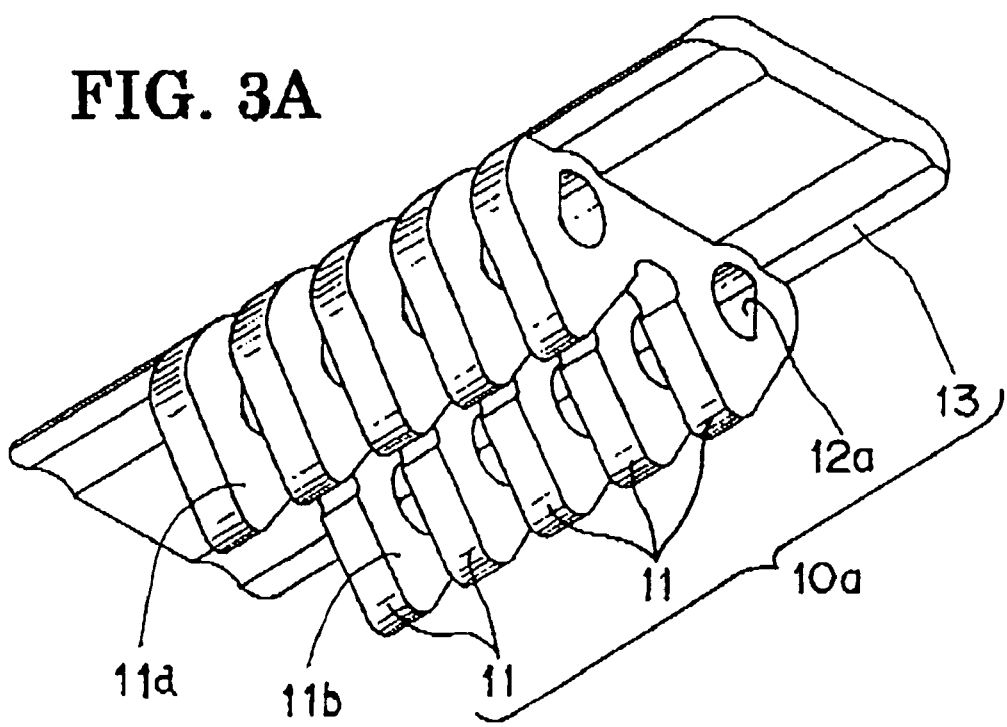
FIG. 3A is a perspective view similar to FIG. 2B, but showing one chain unit of the conveyor chain.
Figure 3B:
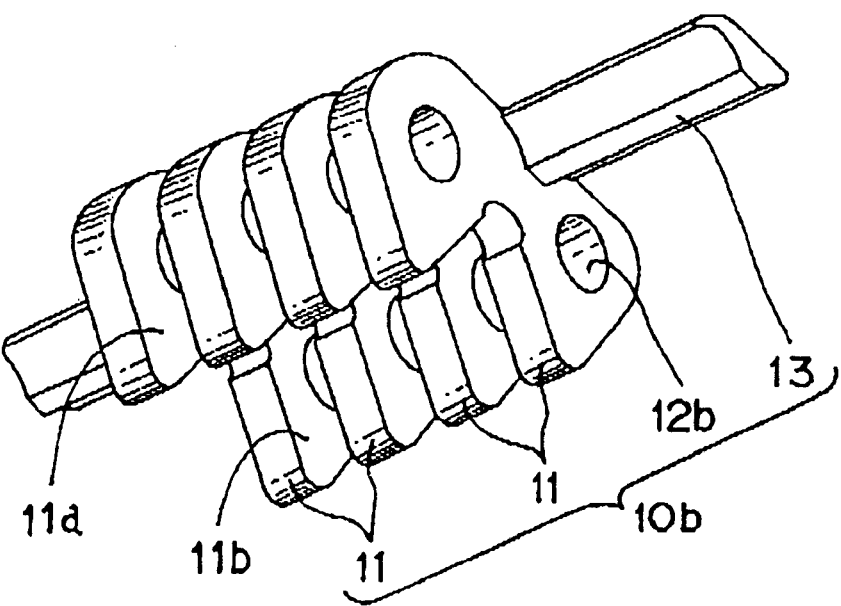
FIG. 3B is a perspective view similar to FIG. 2B, but showing another chain unit of the conveyor chain.

As shown in FIG. 3A, each of the inverted tooth plates 11 of the first chain units 10a has a pair of inverted teeth 11a, 11b formed on a lower side thereof for meshing with teeth of the sprocket, and a pair of pin-accommodation holes 12a formed therein for receiving a pair of connecting pins 20, respectively, of the connecting pins 20. The inverted tooth 11a and 11b have a profile similar to that of meshing teeth of link plates of a silent chain. The pin-accommodation holes 12a have a non-circular shape in cross-section such as a D-shape. The inverted tooth plates 11 of each second chain unit 10b, as shown in FIG. 3B, are structurally the same as the inverted tooth plates 11 of the first chain units 10a with the exception that pin-accommodation holes 12b have a circular shape in cross-section rather than D-shape.

The connector pins 20 have a D-shaped cross-sectional shape complemental in contour to the D-shape of the pin-accommodation holes 12a. Each of the D-shaped connecting pins 20 connects adjacent two chain units 10a and 10b in such a manner that the inverted tooth plates 11 of the first chain unit 10a are interleaved with the inverted tooth plates 11 of the second chain unit 10b.

The conveyor chain of the foregoing construction is able to achieve the same noise-reduction effects as described above with respect to the first embodiment shown in FIGS. 1A and 1B. In addition, by the slats 13 provided on an upper side of the inverted tooth plates 11 transversely across the tooth plates 11, the conveyor chain of the second embodiment is also able to carry an object stably during conveyance.

Figure 4A:
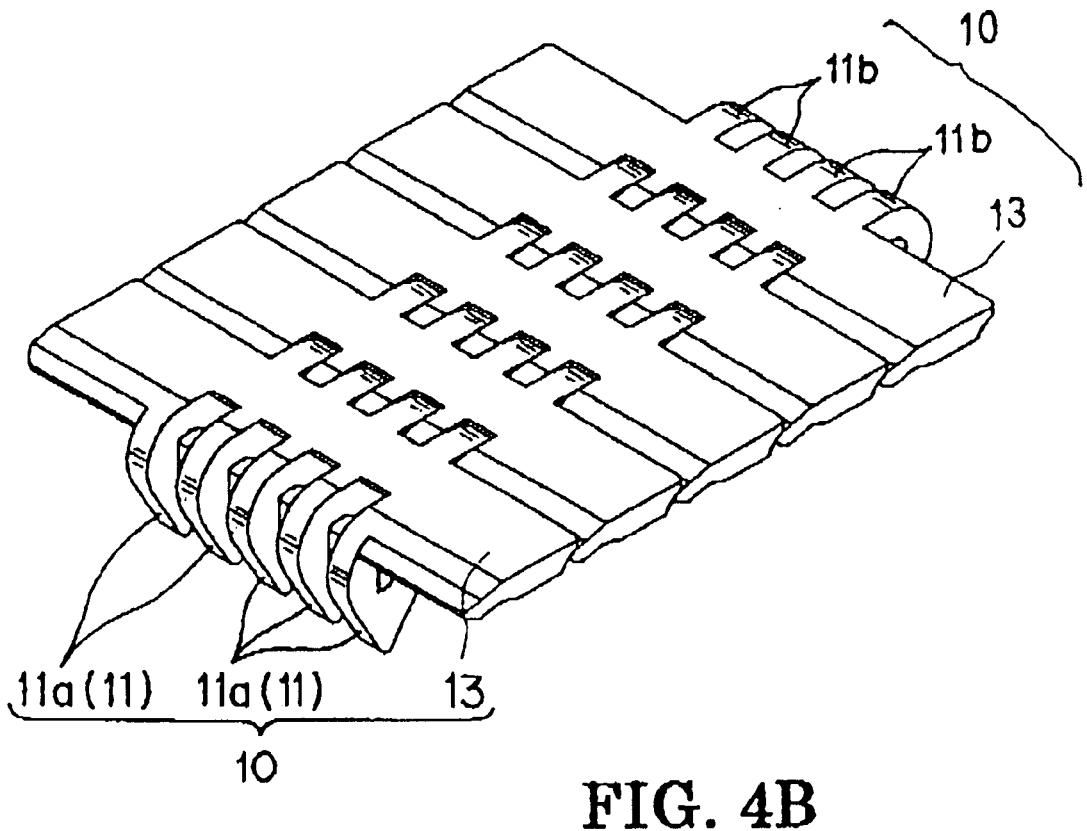
FIG. 4A is a fragmentary perspective view of a conveyor chain according to a third embodiment of the present invention.
Figure 4B:
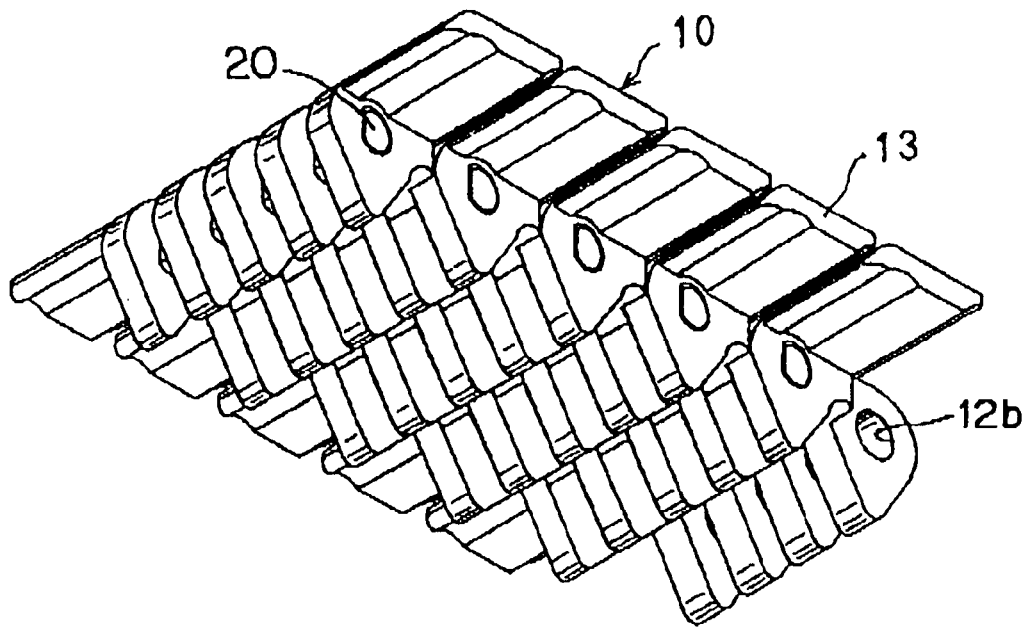
FIG. 4B is a fragmentary perspective view of the conveyor chain of FIG. 4A from the opposite side.

FIGS. 4A and 4B show a part of a conveyor chain shown according to a third embodiment of the present invention. The conveyor chain of this embodiment differs from the conveyor chain of the second embodiment shown in FIGS. 2A–3B only in the structure of chain units 10. As shown in FIG. 1A, the conveyor chain is composed of multiple chain units 10 of the same construction, and all of the chain units 10 have the same object-carrying surface area provided on an outer peripheral side of the chain by way of the slats 13.

Figure 5A:
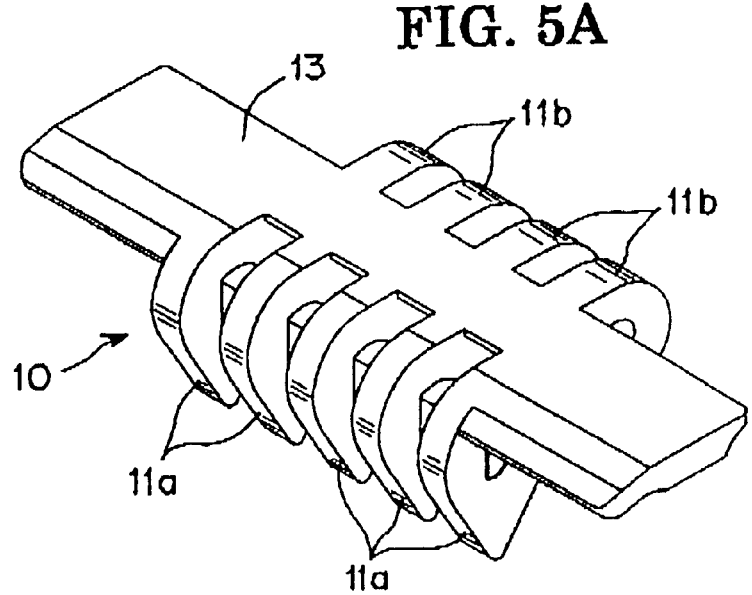
FIG. 5A is a perspective view of a chain unit of the conveyor chain shown in FIG. 4A.
Figure 5B:
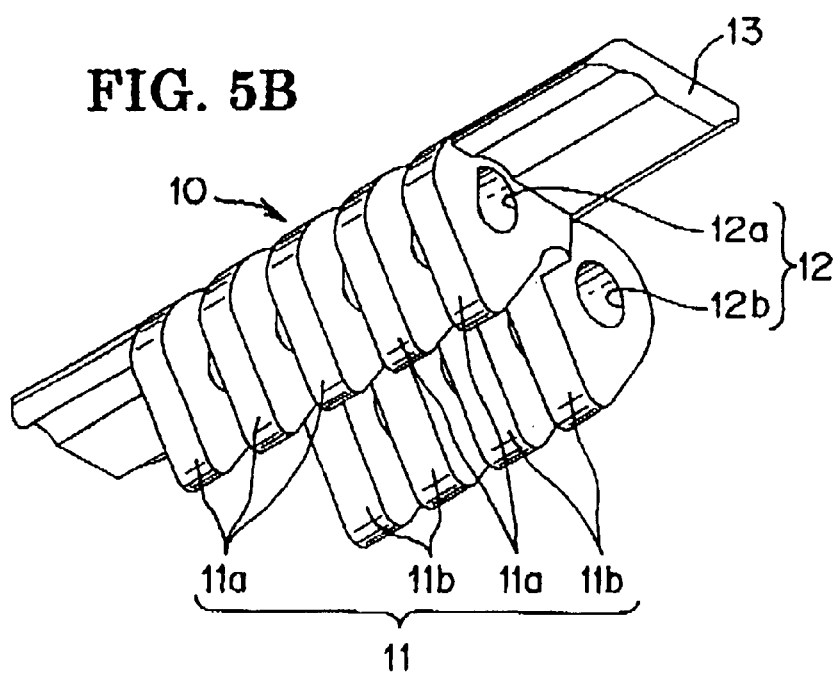
FIG. 5B is a perspective view of the chain unit of FIG. 5A from the opposite side.

As shown in FIGS. 5A and 5B, the teeth 11a of inverted tooth plates 11 located at one end (left end in FIGS. 5A and 5B) of each chain unit 10 and the teeth 11b of inverted tooth plates located at the other end (right end in FIGS. 5A and 5B) of the same chain unit 10 are offset half a pitch in the width direction of the chain. Thus, when adjacent two chain units 10 are joined together by a single connecting pin 20, the teeth 11b of inverted tooth plate 11 of the leading chain unit 10 (when viewed in the direction of travel of the chain) are aligned or superposed with the teeth 11a of inverted tooth plate 11 of the trailing chain unit 10 in the width direction of the chain. In the illustrated embodiment, an additional inverted tooth 11a is provided so that each of the teeth 11b is received between two adjacent ones of the teeth 11a when the two chain units 10 are joined together.

Figure 5C:
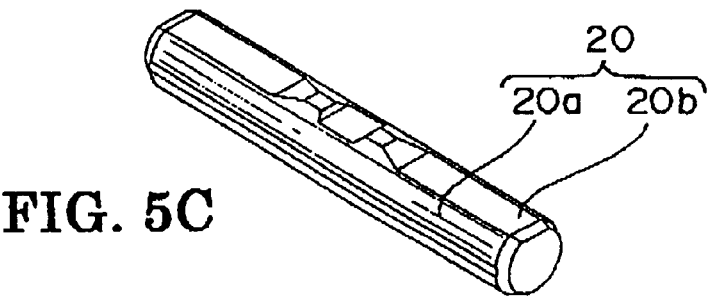
FIG. 5C is a perspective view of a connecting pin of the chain unit of the conveyor chain shown in FIG. 4A.

As shown in FIG. 5B, the pin-accommodation holes 12a located adjacent to the leading end of the chain unit 10 have a D-shape in cross-section, while the pin-accommodation holes 12b located adjacent to the trailing end of the chain unit 10 has a circular shape in cross-section. The connecting pins 20 have a D-shape in cross-section, as shown in FIG. 5C. The D-shaped connecting pins 20 have a circumferential surface composed of a circular arcuate surface portion 20a and a flat surface portion 20b.

The conveyor chain can achieve the same effects as attained by the conveyor chain of the second embodiment shown in FIGS. 2A–3B. Furthermore, since only one kind of chain unit 10 is used, the number of components used is less in the conveyor chain of the third embodiment than in the conveyor chain of the second embodiment. Additionally, on each longitudinal side of the chain, end faces of the respective slats 13 lie flush with one another so that the chain balance in the width direction of the chain can be kept uniform throughout the length of the chain. By virtue of the uniform chain balance, the conveyor chain can travel stably without causing a rolling phenomenon.

Figure 6A:
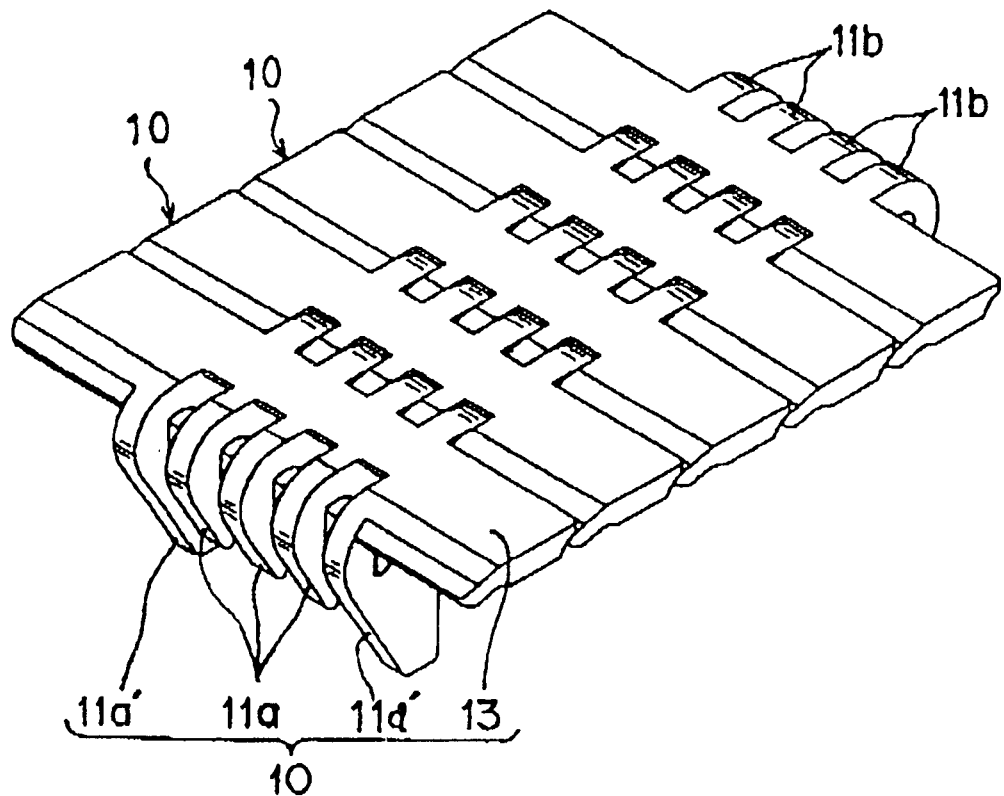
FIG. 6A is a fragmentary perspective view of a conveyor chain according to a fourth embodiment of the present invention.
Figure 6B:
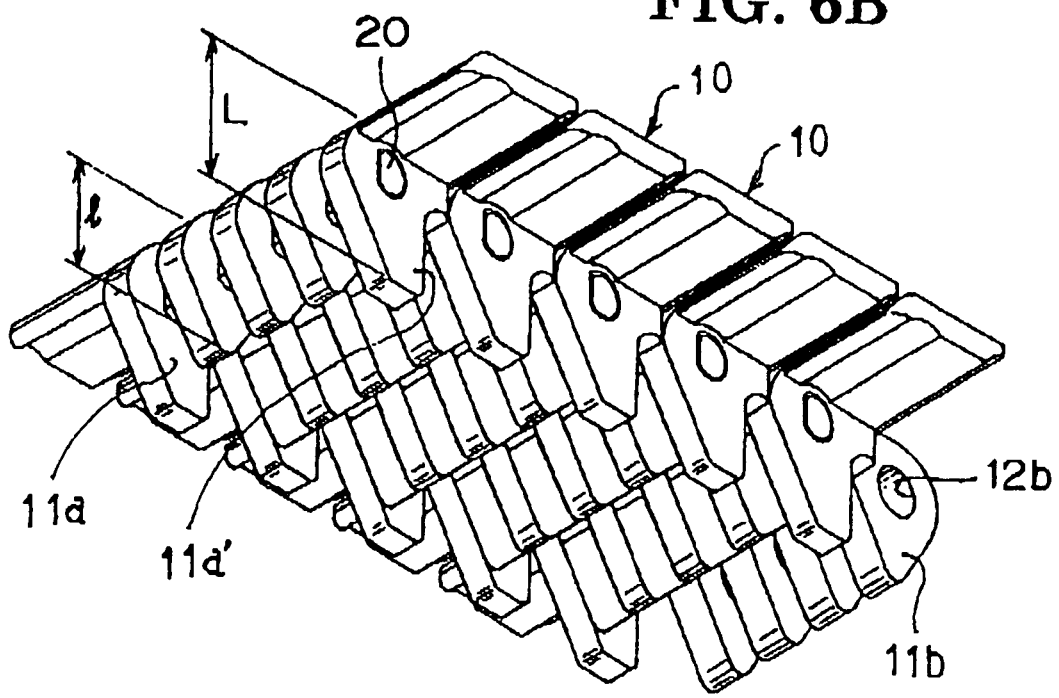
FIG. 6B is a fragmentary perspective view of the conveyor chain of FIG. 6A from the opposite side.

FIGS. 6A and 6B show a part of a conveyor chain according to a fourth embodiment of the present invention. This conveyor chain is substantially the same as the conveyor chain of the third embodiment shown in FIGS. 4A–5C with the exception that two inverted teeth 11a' in each chain unit 10 that are located at opposite outer ends in the width direction of the chain have a height L (FIG. 6B) larger than the height l of the other teeth 11a, 11b of the same chain unit 10. The teeth 11a' also have a larger surface area than the other teeth 11a, 11b.

The conveyor chain of this embodiment is particularly advantageous when used in an application in which the teeth 11a' are brought into slide contact with opposite outer surfaces (i.e., end faces) of a sprocket during travel of the chain. In this application, the teeth 11a' while in slide contact with the opposite end faces of the sprocket guide the travel of the chain in a stale manner, thereby enabling the other teeth 11a, 11b to mesh with the sprocket teeth smoothly without causing skipping or lateral dislocation.

Figure 7A:
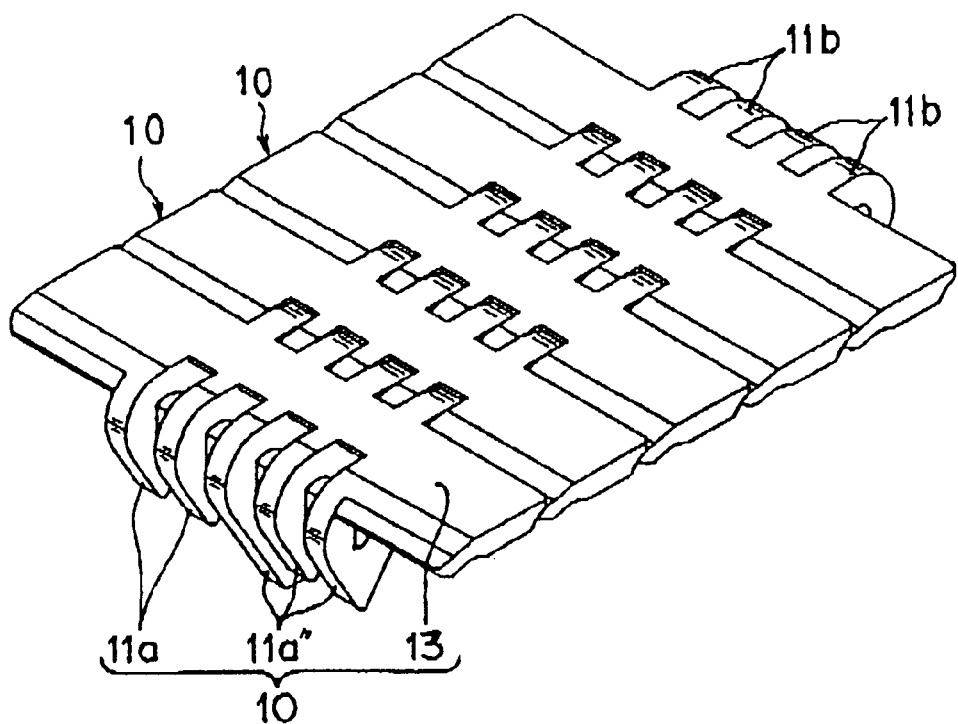
FIG. 7A is a fragmentary perspective view of a conveyor chain according to a fifth embodiment of the present invention.
Figure 7B:
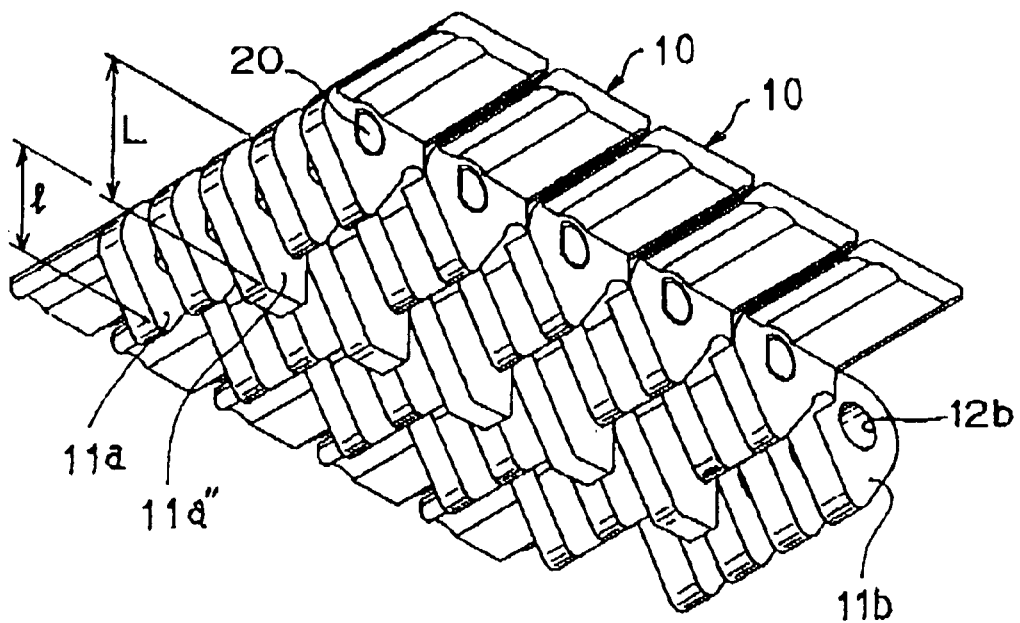
FIG. 7B is a fragmentary perspective view of the conveyor chain of FIG. 7A from the opposite side.

FIGS. 7A and 7B show a part of a conveyor chain according to a fifth embodiment of the present invention. This embodiment is a variant of the forth embodiment shown in FIGS. 6A and 6B and differs from the embodiment of FIGS. 6A and 6B only in that a central inverted tooth 11a" of each chain unit 10 that is located at the center in the width direction of the chain a height L (FIG. 7B) larger than the height l of the other inverted teeth 10a, 11b of the same chain unit 10. The central inverted tooth 11a" also has a larger surface area than the other inverted teeth 11a, 11b.

The conveyor chain of this embodiment is particularly advantageous when used in an application in which the central tooth 11" is brought into slide contact with opposed inside surfaces (i.e., end faces) of two sprockets mounted in juxtaposition to a single shaft. In this application, the central tooth 11" while in slide contact with the opposed end faces of the two juxtaposed sprockets guide the travel of the chain in a stale manner, thereby securing that the other teeth 11a, 11b can smoothly mesh with the sprocket teeth without causing skipping or lateral dislocation.

Though not shown, one of the inverted teeth 11b which is located at the center in the width direction of the chain may be made larger in height and/or surface area than the other inverted teeth 11a, 11b.

Figure 8A:
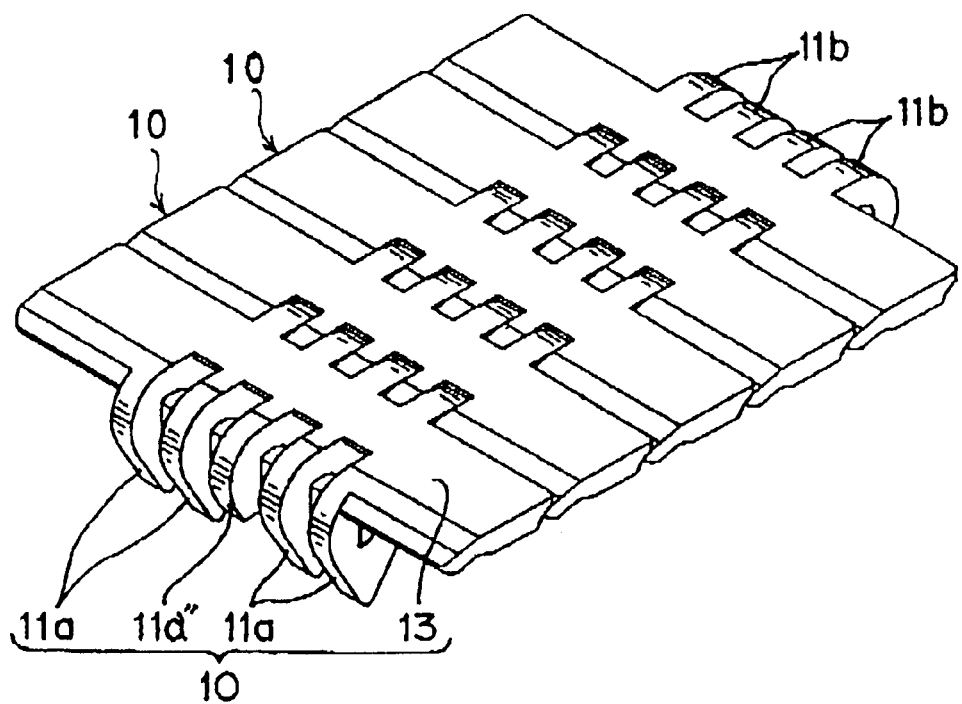
FIG. 8A is a fragmentary perspective view of a conveyor chain according to a sixth embodiment of the present invention.
Figure 8B:
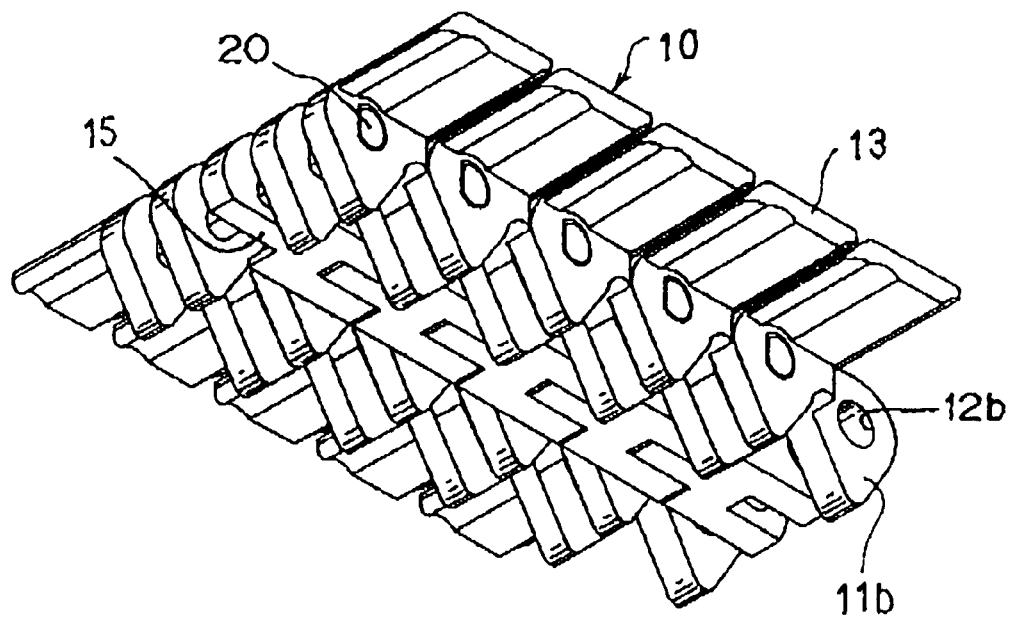
FIG. 8B is a fragmentary perspective view of the conveyor chain of FIG. 8A from the opposite side.

FIGS. 8A and 8B show a part of a conveyor chain according to a sixth embodiment of the present invention. This embodiment differs from the third embodiment shown in FIGS. 4A–5C in that the chain units 10 each have a flat guide surface 15 (FIG. 5B) disposed on the inner peripheral side of the chain and extending in the longitudinal direction of the chain. The flat guide surface 15 is formed by a truncated tip end face of at least one inverted tooth 11a" that is located at the center in the width direction of the chain. In other words, one or more inverted teeth 11a, 11b of each chain unit 10 that are located at a central portion in the width direction of the chain are made smaller in height than the other inverted teeth and have a flat tip end face defining the guide surface 15 of the same chain unit 10.

The conveyor chain of this embodiment is particularly advantageous when used in an application in which a guide rail (not shown) is provided along a conveyance path of the chain, and the guide surface 15 of each chain unit 15 is in slide contact with the guide rail during conveyance travel of the chain. By virtue of a guiding action achieved by slide contact with the flat guide surface 15 and the guide rail, the conveyor chain can travel stably along the conveyance path without causing rolling, meandering even when various objects having different weights are carried on the conveyor chain at random orientation.

Figure 9A:
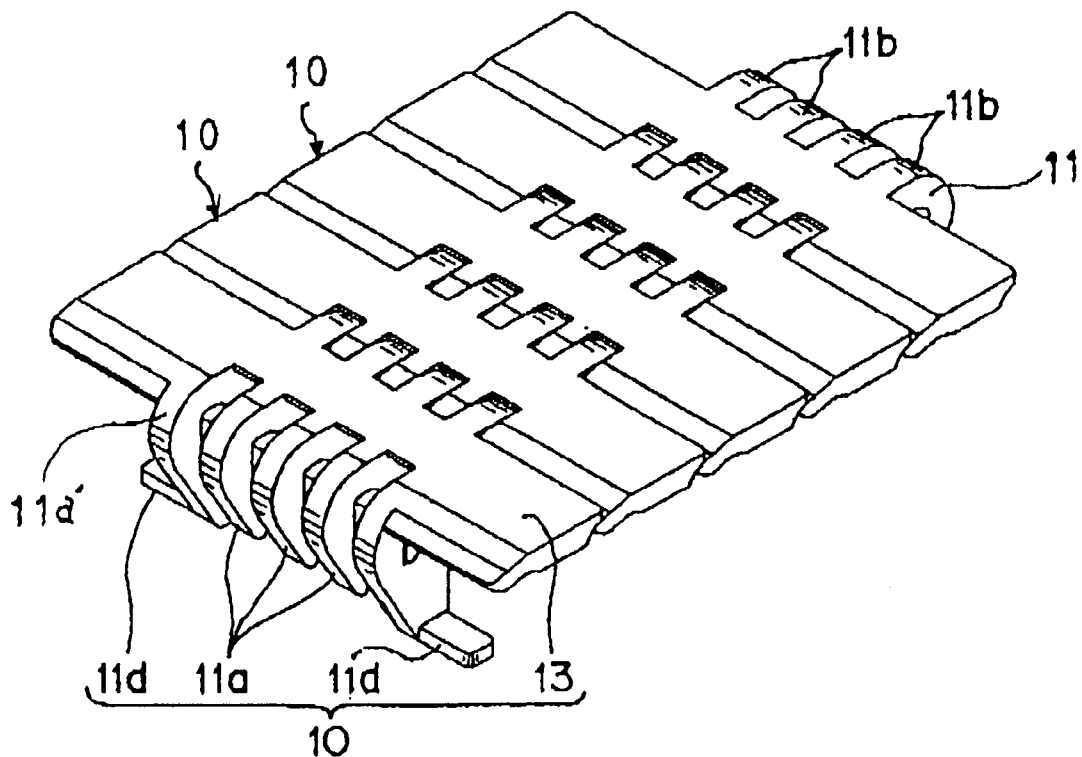
FIG. 9A is a fragmentary perspective view of a conveyor chain according to a seventh embodiment of the present invention.
Figure 9B:
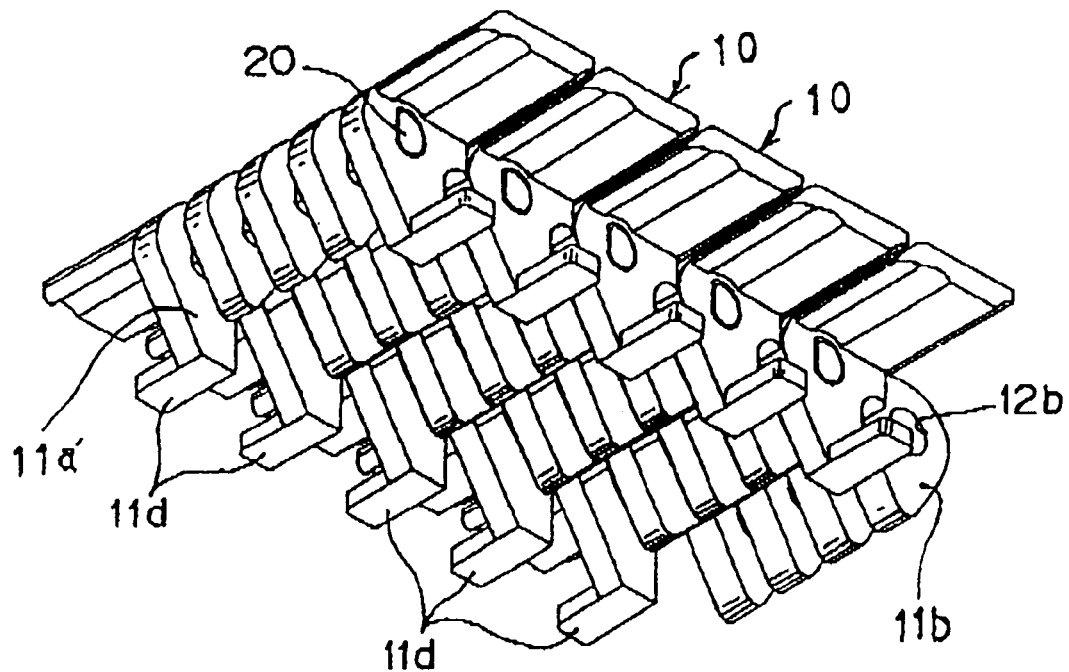
FIG. 9B is a fragmentary perspective view of the conveyor chain of FIG. 9A from the opposite side.

FIGS. 9A and 9B show a part of a conveyor chain according to a seventh embodiment of the present invention. This embodiment differs from the third embodiment shown in FIGS. 4A–5C only in the structure of chain units 10. Specifically, two inverted teeth 11a' of each chain unit 10 that are located at opposite outer ends in the width direction of the chain each have a guide lug lid formed integrally with the outermost tooth 11a and projecting therefrom in a lateral outward direction.

This arrangement is particularly advantageous when used in an application in which a side guide rail (not shown) is provided on each side of the conveyor chain along the conveyance path such that the side guide chain is disposed in a space defined between the slats 13 and the guide lugs 11d of the chain. In this application, the guide lugs 11d are held in slide contact with the side guide rails during conveyance travel of the chain, so that the conveyor chain can travel stably along the conveyance path without causing floating during travel. The conveyor chain is, therefore, able to provide a stable carrying surface at all times to an object to be conveyed.

Figure 10A:
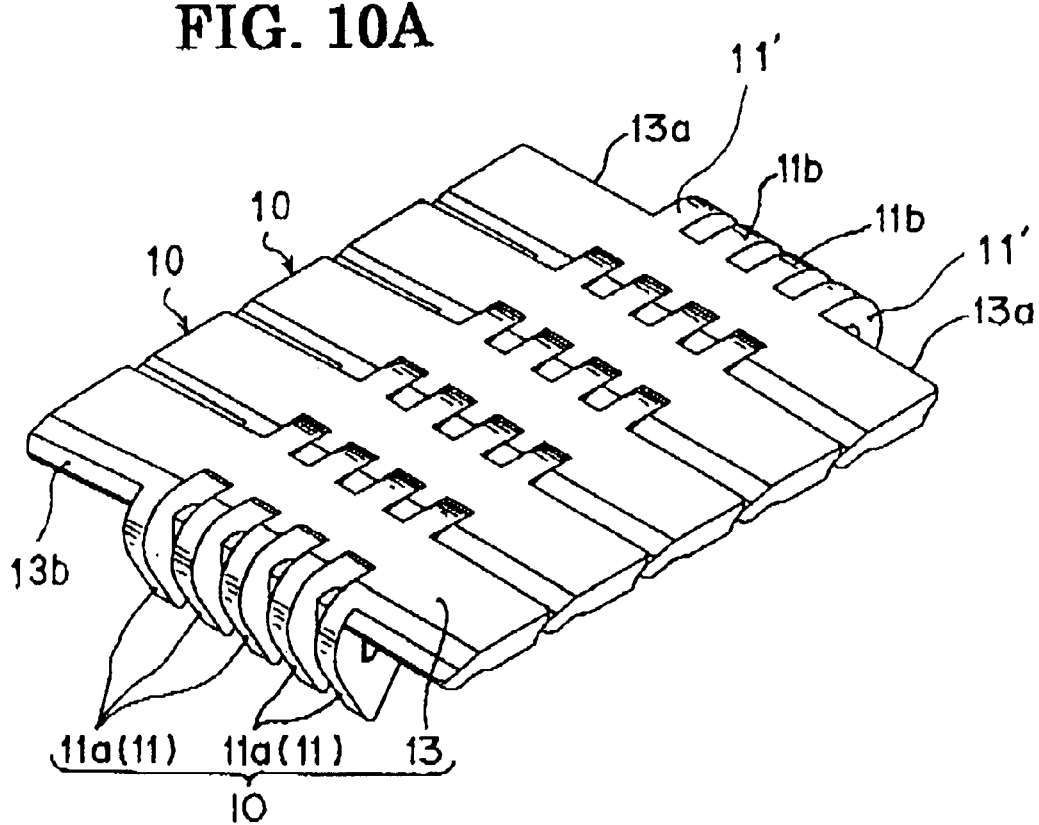
FIG. 10A is a fragmentary perspective view of a conveyor chain according to an eighth embodiment of the present invention.
Figure 10B:
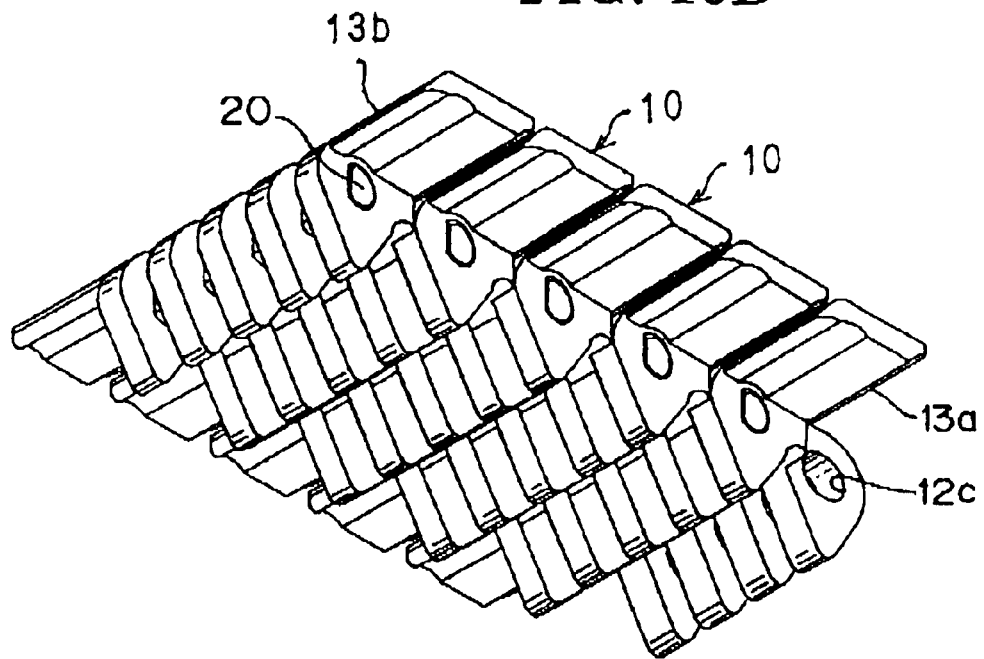
FIG. 10B is a fragmentary perspective view of the conveyor chain of FIG. 10A from the opposite side.

FIGS. 10A and 10B show a part of a conveyor chain according to an eighth embodiment of the present invention. This embodiment differs from the third embodiment shown in FIGS. 4A–5C only in the structure of a chain unit 10.

Figure 11A:
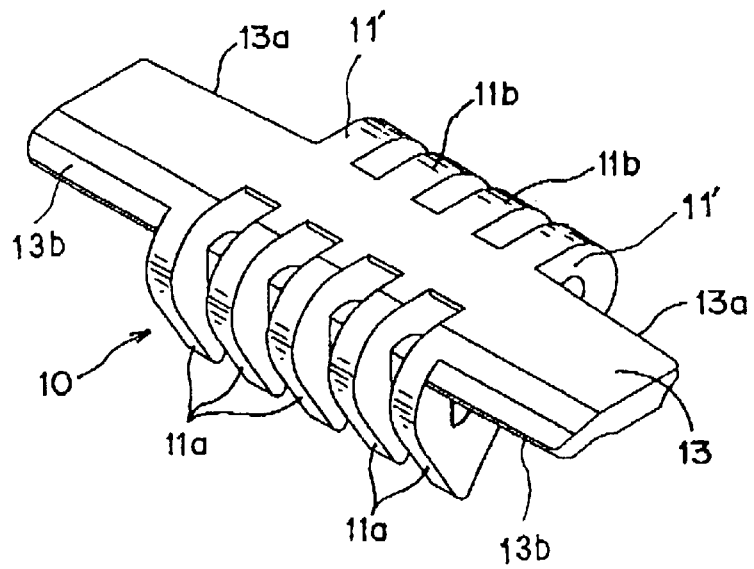
FIG. 11A is a perspective view of a chain unit of the conveyor chain shown in FIG. 10A.
Figure 11B:
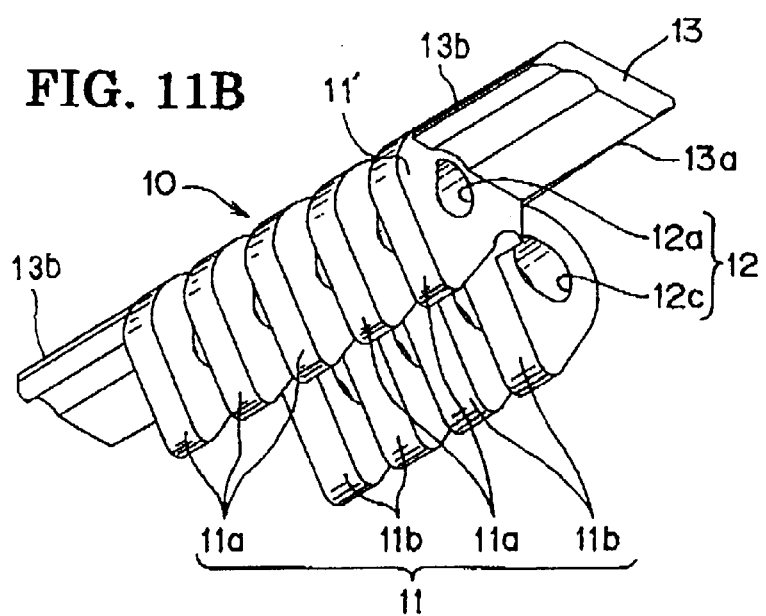
FIG. 11B is a perspective view of the chain unit of FIG. 11A from the opposite side.

Specifically, the slat 13 of each chain unit 10, as best shown in FIGS. 11A and 11B, has a wing portion (not designated) projecting in a lateral outward direction from an outermost inverted tooth plate 11' of the chain unit 10. The wing portion has a convexly arcuate trailing edge 13a and a straight leading edge 13b when viewed from the direction of conveyance of the chain. The pin-accommodation holes 12c that are located adjacent to the trailing end of the chain unit 10 comprise an oblong hole having a major axis extending substantially parallel to the longitudinal direction of the chain. The radius of curvature of the arcuate trailing edge 13a is determined depending on the radius of curvature of a curved portion of the conveyance path in a horizontal plane.

Figure 11C:
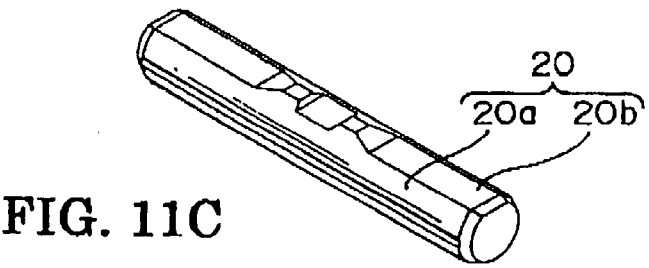
FIG. 11C is a perspective view of a connecting pin of the chain unit of the conveyor chain shown in FIG. 10A.

When the conveyor chain travels along a curved portion in a horizontal plane of the conveyance path, the oblong pin-accommodation holes 12c of each individual chain unit 10 allow the connecting pin 20 (FIGS. 10B and 11C) to move freely relative to the inverted tooth plates 11 within the extremity of the oblong pin-accommodating holes 12c, and at the same time, the arcuate trailing edges 13a of the slat 13 of the same chain unit 10 permit free movement of the slat 13 in the horizontal plane. Accordingly, the conveyor chain is able to pass the curved conveyance path portion smoothly and stably without causing collision or overlapping between the adjacent slats 13.

Figure 12A:
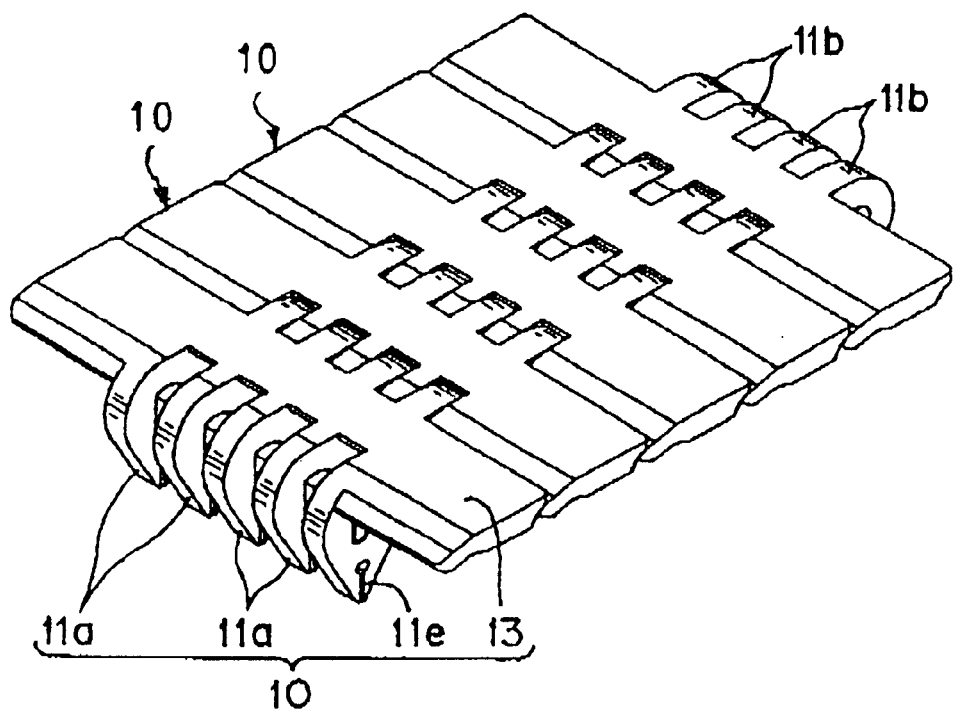
FIG. 12A is a fragmentary perspective view of a conveyor chain according to a ninth embodiment of the present invention.
Figure 12B:
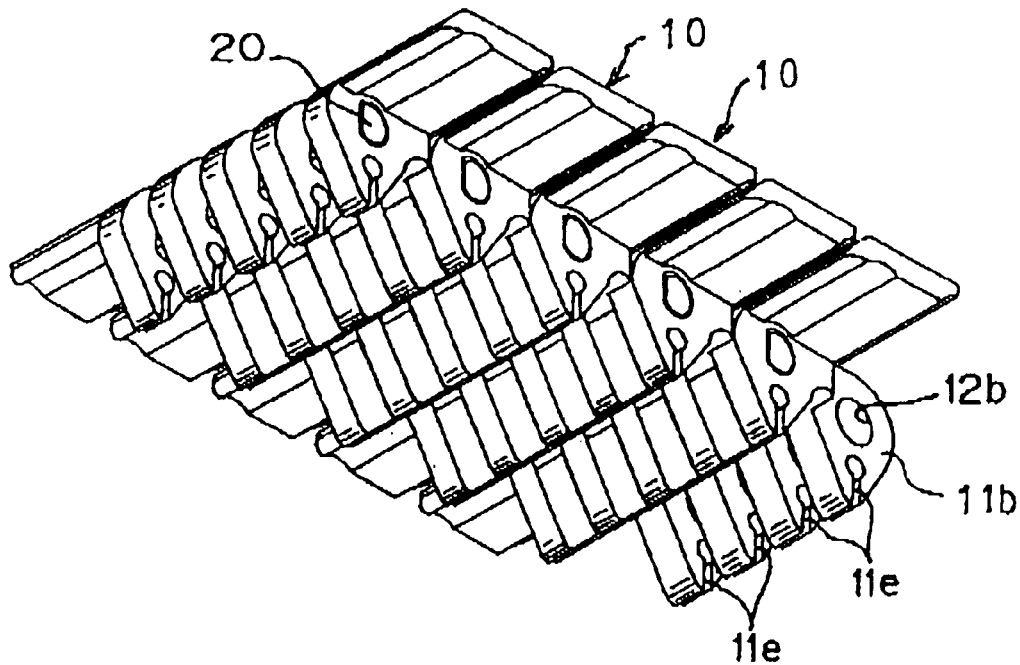
FIG. 12B is a fragmentary perspective view of the conveyor chain of FIG. 12A from the opposite side.
Figure 13A:
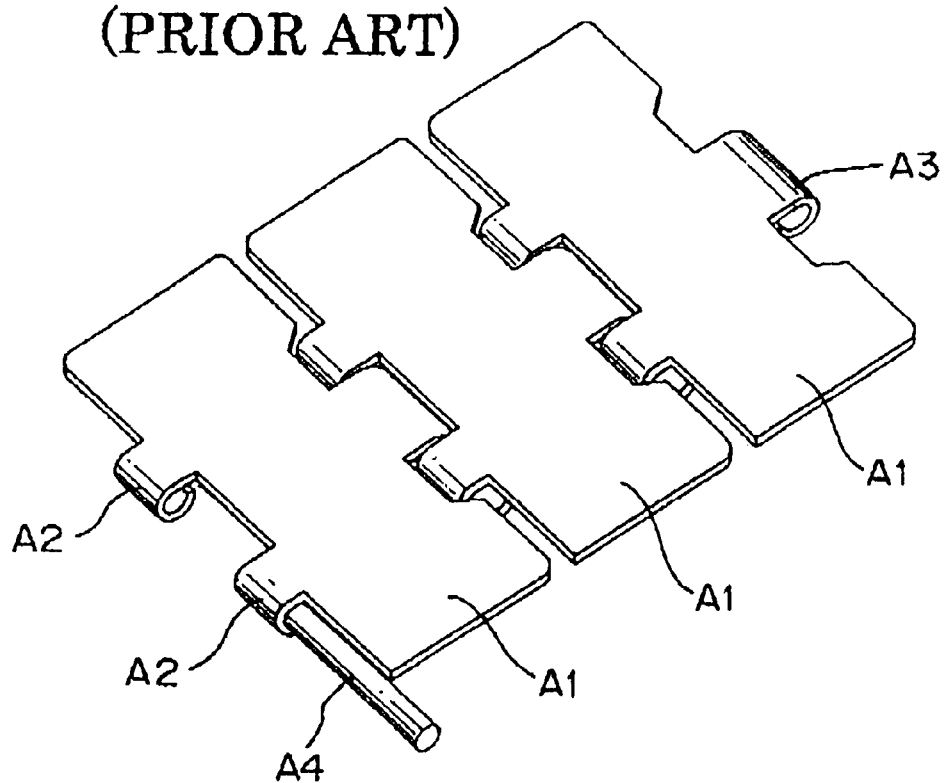
FIG. 13A is a fragmentary perspective view of a conventional top plate type conveyor chain.
Figure 13B:
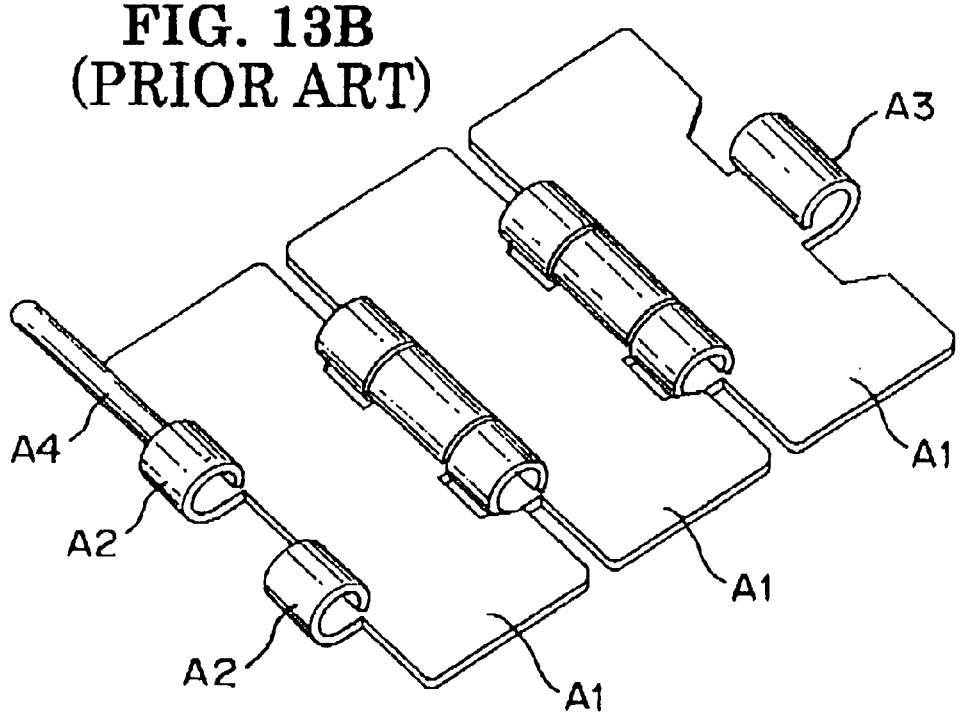
FIG. 13B is a fragmentary perspective view of the conventional top plate type conveyor chain of FIG. 13A from the opposite side.

FIGS. 12A and 12B show a part of a conveyor chain according to a ninth embodiment of the present invention. This embodiment differs from the third embodiment shown in FIGS. 4A–5C only in that each of the pair of inverted teeth 11a, 11b has a slit 11e opening to a tip end and opposite end faces of the inverted tooth 11a, 11b.

By thus providing the slit 11e, the inverted teeth 11a, 11b are elastically deformable when meshing with the sprocket teeth. With this elastic deformation, the sliding sound generated during meshing engagement between the inverted teeth 11a, 11b and the sprocket teeth can be reduced to a negligible level. When a lubricating oil is applied to smoothen the meshing between the inverted teeth 11a, 11b and the sprocket teeth, the slit 11e holds the lubricating oil therein and is able to supply the lubricating oil to the sprocket over a long period of use. This lubrication improves the durability and service life of the conveyor chain.

In the embodiments described above, the chain unit 10 (1a, 10b) is molded of synthetic resin. The materials eligible for the chain unit 10 preferably include so-called engineering plastics which are superior in physical, chemical and mechanical properties to the general-purpose plastics. Among others, polyamide resins (showing excellent wear-resistance, self-lubricity, shock-resistance, and chemical-resistance) polyacetals (showing excellent wear-resistance and fatigue-resistance) and polybutyleneterephtalate resins (showing excellent wear-resistance, chemical-resistance, heat-resistance and dimensional stability).

The inverted teeth 11a, 11b may have any suitable profiles including a rectilinear profile, curvilinear profile and a combination of them. In addition, the inverted tooth plates 11 may not be uniform in shape and configuration. Two or more tooth plates of different profiles may be used to form a conveyor chain.

Obviously, numerous modifications and variations of the present invention are possible in light of the above teachings. It is therefore to be understood that within the scope of the appended claims, the present invention may be practiced otherwise than as specifically described herein.

What is claimed is:

1. A conveyor chain comprising:
a number of chain units connected with one another by connecting pins, said chain units forming an endless loop, the chain having an outer peripheral side adapted to carry an object for conveyance of the object along a conveyance path and a toothed inner peripheral side adapted to engage a rotatable sprocket for transmitting power from the sprocket to the chain, said chain having a length direction extending along the direction of chain travel as said sprocket rotates, and a width direction transverse to said length direction;
each of the chain units comprising first and second widthwise rows of teeth, said teeth projecting inwardly toward the interior of said loop, the teeth of each said row having aligned pin-accommodation holes formed therein for receiving one of said connecting pins; and
each of the connecting pins connecting two adjacent chain units in such a manner that the teeth of a row of teeth of one of said two adjacent chain units is interleaved with the teeth of a row of teeth of the other of said two adjacent chain units;
wherein said rows of teeth on each chain unit have a W-shaped configuration whereby an engagement surface formed by flanks of a plurality of said teeth in one of said rows can engage with the same sprocket tooth in sliding contact therewith while said sprocket tooth is disposed between said rows.

2. A conveyor chain according to claim 1, wherein the pin-accommodation holes have a circular shape in cross-section and the connecting pins have a circular shape in cross-section.

3. A conveyor chain according to claim 1, wherein the chain units are composed of first chain units and second chain units alternately arranged in the longitudinal direction of the chain, the pin-accommodation holes in each of the first chain units have a non-circular shape in cross-section, the pin-accommodation holes in each of the second chain units have a circular shape in cross-section, and the connecting pins have a non-circular shape in cross-section complemental in contour to the cross-sectional shape of the pin-accommodation holes in the first chain units.

4. A conveyor chain according to claim 1, wherein each of the teeth of the first widthwise row of teeth of each chain unit is aligned with a tooth of the second widthwise row of teeth of the same chain unit in the longitudinal direction of the chain.

5. A conveyor chain according to claim 1, wherein the teeth of the first widthwise row of teeth of each chain unit are laterally offset by half a pitch in the width direction of the chain from the teeth of the second widthwise row of teeth of the same chain unit.

6. A conveyor chain according to claim 5, wherein the pin-accommodation holes in one widthwise row of teeth in each chain unit have a non-circular shape in cross-section, the pin-accommodation holes in the other widthwise row of teeth in the same chain unit have a circular shape in cross-section, and the connecting pins have a non-circular shape in cross-section complemental in contour to the cross-sectional shape of the pin-accommodation holes in said one widthwise row of teeth.

7. A conveyor chain according to claim 1, wherein each said chain unit has two inwardly projecting teeth located at opposite outer ends in the width direction of the chain, said two inwardly projecting teeth having laterally facing surfaces adapted for sliding contact with opposite end faces of a sprocket and having a height larger than the height of the other inwardly projecting teeth of the same chain unit.

8. A conveyor chain according to claim 7, wherein said two inwardly projecting teeth have a larger surface area than said other inwardly projecting teeth.

9. A conveyor chain according to claim 1, wherein each said chain unit has two inwardly projecting teeth located at opposite outer ends in the width direction of the chain, said two inwardly projecting teeth having laterally facing surfaces adapted for sliding contact with opposite end faces of a sprocket and having a surface area larger than that of the other inwardly projecting teeth of the same chain unit.

10. A conveyor chain according to claim 1, wherein each said chain unit has a central, inwardly projecting, tooth located at the center in the width direction of the chain, said central, inwardly projecting, tooth having laterally facing surfaces adapted for sliding contact with opposed inside surfaces of two laterally juxtaposed sprockets, said central, inwardly projecting, tooth having a height larger than the height of the other inwardly projecting teeth of the same chain unit.

11. A conveyor chain according to claim 10, wherein the central, inwardly projecting tooth has a larger surface area than said other inwardly projecting teeth.

12. A conveyor chain according to claim 1, wherein each said chain unit has a central, inwardly projecting, tooth located at the center in the width direction of the chain, said central, inwardly projecting, tooth having laterally facing surfaces adapted for sliding contact with opposed inside surfaces of two laterally juxtaposed sprockets, said central, inwardly projecting, tooth having a surface area larger than the surface area of the other inwardly projecting teeth of the same chain unit.

13. A conveyor chain according to claim 1, wherein the chain units each have a flat guide surface disposed on the inner peripheral side of the chain and extending in the longitudinal direction of the chain for sliding contact with a guide rail disposed along the conveyance path.

14. A conveyor chain according to claim 13, wherein the flat guide surface of each chain unit is formed by a truncated tip end face of at least one selected tooth of the last-mentioned chain unit.

15. A conveyor chain according to claim 14, wherein said selected tooth is located at the center in the width direction of the chain.

16. A conveyor chain according to claim 1, wherein two inwardly projecting teeth of each chain unit, that are located at opposite outer ends in the width direction of the chain each have a guide lug projecting in a lateral outward direction for sliding contact with a side guide rail provided on each side of the chain along the conveyance path, so as to prevent the chain from floating during travel.

17. A conveyor chain according to claim 1, wherein each of said inwardly projecting teeth has a slit opening to a tip end and to opposite lateral faces thereof.

18. A conveyor chain according to claim 1, wherein each of the chain units comprises a slat disposed on the outer peripheral side of the chain and extending transversely across the width of the chain said teeth of each chain unit projecting inwardly from the slat thereof.

19. A conveyor chain according to claim 18, wherein the slat of each chain unit has a wing portion projecting in a lateral outward direction from an outermost tooth thereof, the wing portion having a straight leading edge adjacent the first widthwise row of teeth of said chain unit and a convexly arcuate trailing edge adjacent the second widthwise row of teeth of said chain unit, and the pin-accommodation holes in the second widthwise row of teeth of the chain unit comprise an oblong hole having a major axis extending substantially parallel to the longitudinal direction of the chain.

20. A conveyor chain according to claim 18, wherein the chain units are composed of first chain units and second chain units alternately arranged in the longitudinal direction of the chain, each chain unit comprises a slat, and the slat of each of the first chain units has a larger object-carrying surface area than the slat of each of the second chain units.

21. A conveyor chain according to claim 18, wherein the slat of each chain unit is unitary with the inverted teeth thereof.

22. A conveyor chain according to claim 18, wherein the slat of each chain unit is structurally independent of, but connected to, the teeth thereof.

* * * * *